US006755559B2

(12) United States Patent
Wang et al.

(10) Patent No.: US 6,755,559 B2
(45) Date of Patent: Jun. 29, 2004

(54) LUMINAIRE WITH ADJUSTABLE LAMP ORIENTATION

(75) Inventors: James P. Wang, Blacksburg, VA (US); Marc A. Schetselaar, Christiansburg, VA (US); Richard E. Simon, Roanoke, VA (US)

(73) Assignee: Hubbell Incorporated, Orange, CT (US)

( * ) Notice: Subject to any disclaimer, the term of this patent is extended or adjusted under 35 U.S.C. 154(b) by 0 days.

(21) Appl. No.: 10/184,055

(22) Filed: Jun. 28, 2002

(65) Prior Publication Data

US 2004/0001336 A1 Jan. 1, 2004

(51) Int. Cl.[7] .................................................. B60Q 1/00

(52) U.S. Cl. ....................... 362/368; 362/147; 362/287; 362/372

(58) Field of Search ................................ 362/404, 427, 362/269, 371, 372, 287, 285, 270, 147, 365, 368

(56) References Cited

U.S. PATENT DOCUMENTS 2,675,466 A 4/1954 Baker
2,835,791 A 5/1958 Horwitz
3,185,835 A 5/1965 Muller et al.
3,705,301 A * 12/1972 Franklin et al. ............ 362/308
3,962,675 A 6/1976 Rowley et al.
4,158,223 A 6/1979 Walley et al.
4,186,433 A 1/1980 Baldwin
4,388,681 A 6/1983 Meyer
4,791,539 A 12/1988 Ewing
5,291,381 A * 3/1994 Price .......................... 362/366
5,662,407 A 9/1997 Fischer et al.
5,727,871 A 3/1998 Kotloff
5,909,955 A 6/1999 Roorda
5,927,843 A 7/1999 Haugaard et al.
5,997,158 A 12/1999 Fischer et al.
6,059,422 A 5/2000 Fischer et al.
6,059,424 A 5/2000 Kotloff
6,149,280 A 11/2000 Quiogue et al.
6,168,300 B1 1/2001 Fischer et al.
6,182,848 B1 2/2001 Wang
6,224,233 B1 5/2001 Fischer et al.
6,264,344 B1 7/2001 Quiogue et al.
6,276,818 B1 8/2001 Wang
6,367,945 B2 4/2002 Quiogue et al.
6,422,720 B2 7/2002 Fischer et al.
6,481,871 B2 * 11/2002 Jamison ...................... 362/287
6,525,890 B1 * 2/2003 Wang et al. ................ 359/896

FOREIGN PATENT DOCUMENTS

CA 916117 12/1974

* cited by examiner

*Primary Examiner*—John Anthony Ward
(74) *Attorney, Agent, or Firm*—Tara L. Hoffman; Alfred N. Goodman; Mark S. Bicks

(57) ABSTRACT

A luminaire comprising an optical assembly that has a mounting interface. A socket holder has a mounting member that is adapted to mount the socket holder to the mounting interface of the optical assembly. First and second proximate surfaces are adapted to support a socket and a light source in first and second orientations, respectively. The socket holder defines a central axis. A longitudinal axis is defined by the socket and the light source in the first orientation is substantially parallel to the central axis of the socket holder and a longitudinal axis of the socket and the light source in the second orientation is angled with respect to the central axis of the socket holder.

36 Claims, 8 Drawing Sheets

LUMINAIRE WITH ADJUSTABLE LAMP ORIENTATION

FIELD OF THE INVENTION

The present invention relates to a luminaire adapted to mount to a canopy or ceiling that can support a lamp in different orientations. Additionally, the present invention relates to a luminaire that facilitates installation and replacement of the lamp. More specifically, the luminaire includes a socket holder capable of supporting the lamp in first and second orientations and that is movable between unlocked and locked positions.

BACKGROUND OF THE INVENTION

A luminaire is a light fixture that is typically mounted to a canopy, ceiling or light pole. Conventional luminaires include a ballast electrically connected to a socket and lamp, and an optical refractor or lens that encloses the lamp and allows light rays from the lamp to emanate therethrough.

Conventional luminaires generally provide only one lamp orientation, usually either vertical or horizontal. Additionally, problems arise in installing and maintaining conventional luminaires. For example, installation often requires more than one person. Also, performing maintenance such as replacing the lamp often requires disassembly of the luminaire. Also, some conventional luminaires are bulky and include unnecessary parts. Moreover, some conventional luminaires are not easily adaptable to a variety of optical refractors.

Examples of conventional luminaires include U.S. Pat. Nos. 6,394,628, 6,276,818 and 6,182,848 to Wang; U.S. Pat. Nos. 6,367,945 and 6,264,344 to Quioque et al.; U.S. Pat. Nos. 6,224,233, 6,059,422, and 5,662,407 to Fischer et al.; U.S. Pat. No. 4,388,681 to Meyer; U.S. Pat. No. 4,186,433 to Baldwin; and U.S. Pat. No. 2,675,466 to Baker, the subject matter of each of which is herein incorporated by reference.

SUMMARY OF THE INVENTION

Accordingly, an object of the present invention is to provide a luminaire capable of supporting a light source, such as a lamp, in at least two different orientations.

Another object of the present invention is to provide a luminaire that facilitates installation and maintenance thereof, particularly when replacing the light source or lamp of the luminaire.

Yet another object of the present invention is to provide a luminaire that is compact and includes a minimal number of parts.

Still another object of the present invention is to provide a luminaire that allows a variety of optical assemblies to be used with the luminaire.

The foregoing objects are basically attained by a luminaire comprising an optical assembly that has a mounting interface. A socket holder has a mounting member that is adapted to mount the socket holder to the mounting interface of the optical assembly. First and second proximate surfaces are adapted to support a socket and a light source in first and second orientations, respectively. The socket holder defines a central axis. A longitudinal axis is defined by the socket and the light source in the first orientation is substantially parallel to the central axis of the socket holder and a longitudinal axis of the socket and the light source in the second orientation is angled with respect to the central axis of the socket holder.

The foregoing objects are also attained by a luminaire, comprising an optical assembly having a mounting interface including at least one mounting aperture. A socket holder is coupled to the optical assembly and supports a socket and a light source at a first end. The socket holder is movable between locked and unlocked positions with respect to the mounting interface of the optical member. Socket holder includes a mounting member at a second end opposite the first end that is adapted to mount the socket holder to the mounting interface of the optical assembly. The mounting member has a guide portion and a locking portion engaged with the mounting aperture of the mounting interface of the optical assembly in the locked position thereby interlocking the socket holder and optical assembly, and disengaged with the mounting aperture in the unlocked position, wherein the guide portion facilitates engagement and disengagement of the locking portion with the mounting aperture.

The foregoing objects are also attained by a luminaire comprising a support panel and an optical assembly including a reflector coupled to a refractor. The reflector is releasably secured to the support panel thereby substantially restricting movement of the optical assembly with respect to the support panel. The reflector includes a mounting interface. A socket holder is coupled to the reflector of the optical assembly at the mounting interface. The socket holder is movable between locked and unlocked positions with respect to the reflector and the optical assembly. The socket holder supports a socket and a light source with the reflector and the refractor substantially enclosing the light source.

Other objects, advantages and salient features of the invention will become apparent from the following detailed description, which, taken in conjunction with annexed drawings, discloses preferred embodiments of the present invention.

BRIEF DESCRIPTION OF THE DRAWINGS

Referring to the drawings which form a part of this disclosure.

DETAILED DESCRIPTION OF THE INVENTION

Embodiment of FIGS. 1–10

Figure 1:
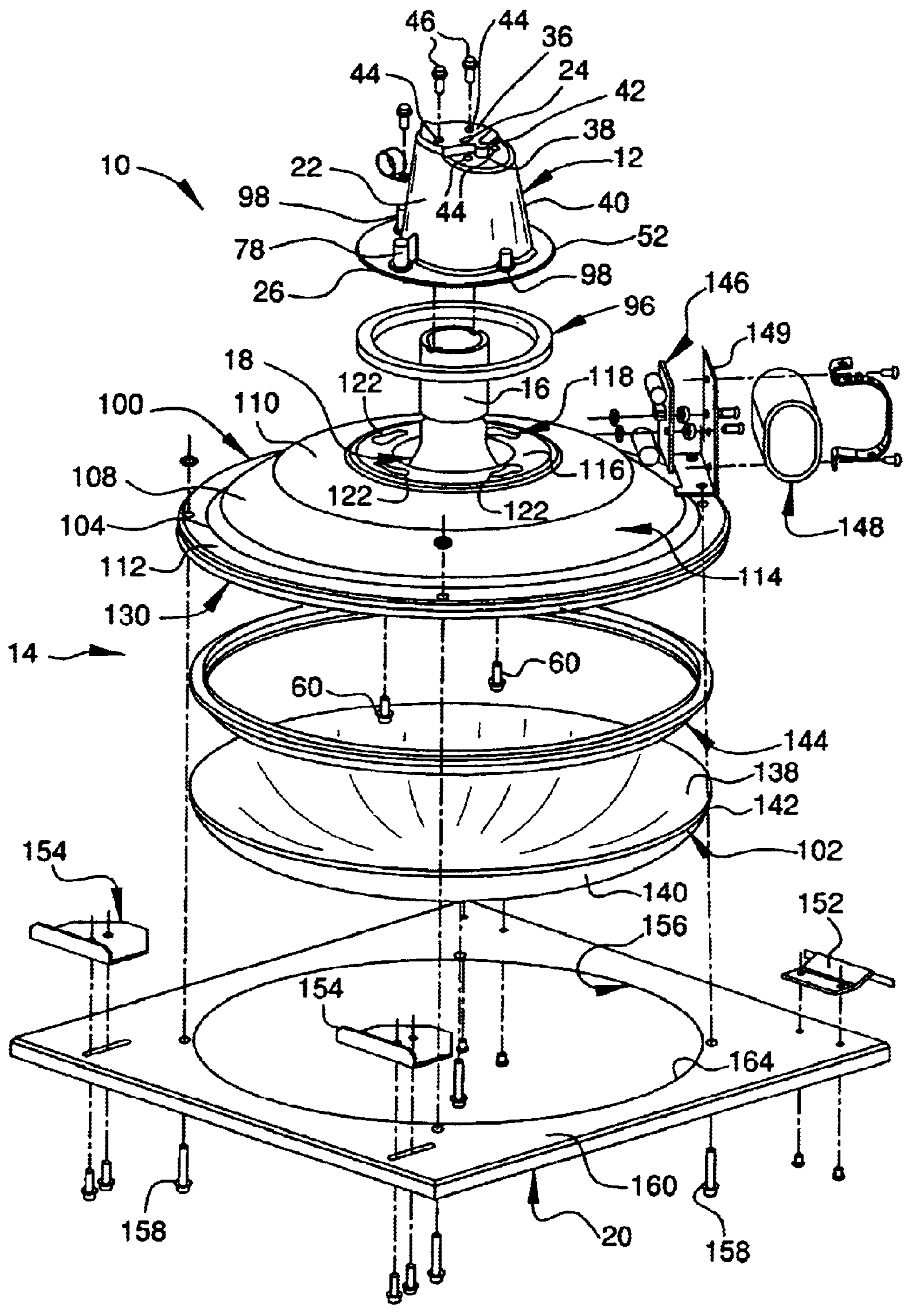
FIG. 1 is an exploded perspective view of a luminaire in accordance with a first embodiment of the present invention showing a socket holder, optical assembly and support panel.
Figure 2:
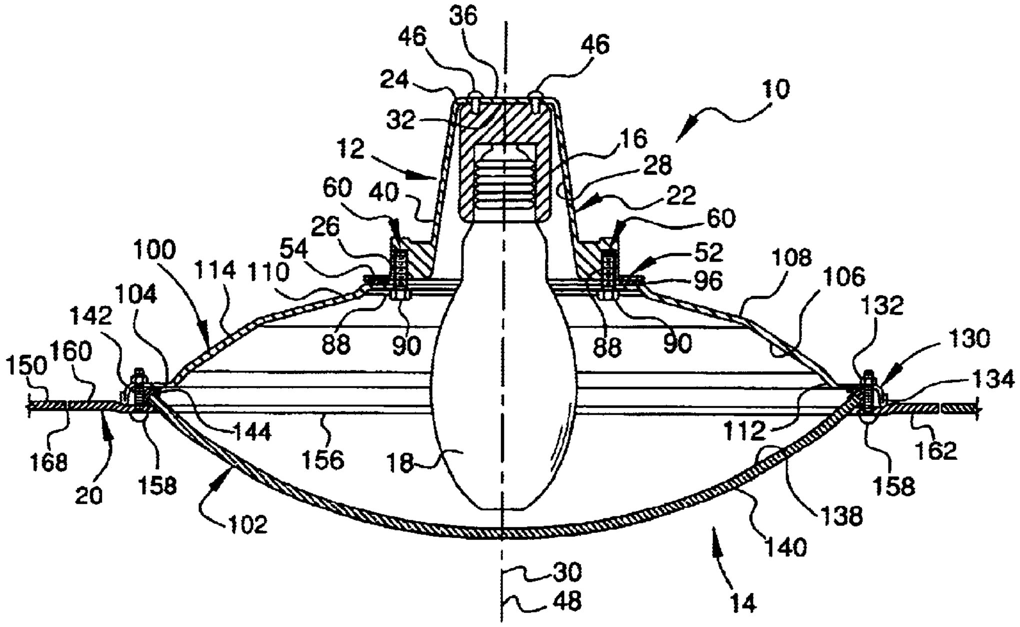
FIG. 2 is an elevational side view taken in section of the assembled luminaire illustrated in FIG. 1, showing a light source of the luminaire in a first orientation.
Figure 3:
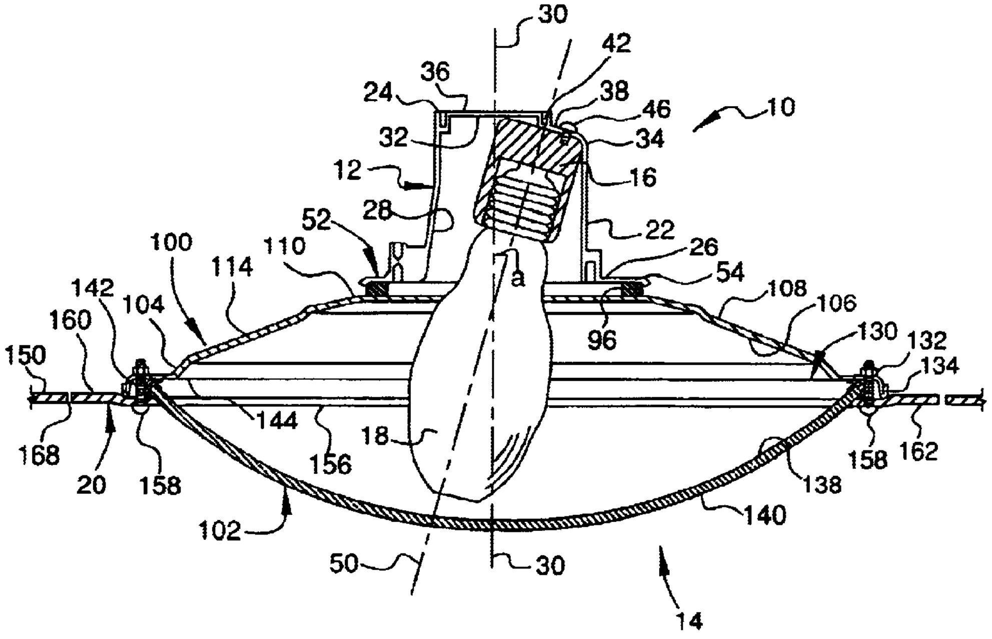
FIG. 3 is an elevational side view taken in section traverse to the sectional view of the luminaire illustrated in FIG. 2, showing the light source of the luminaire in a second orientation.

Referring to FIGS. 1–10, a luminaire 10 in accordance with a first embodiment the present invention includes a socket holder 12 releasably coupled to an optical assembly 14. Socket holder 12 supports a socket 16 and a light source 18, which is preferably a high intensity discharge lamp. Optical assembly 14 encloses light source 18 and allows light rays to emanate therefrom. Socket holder 12 can support light source 18 in more than one orientation, as seen in FIGS. 2 and 3, allowing selection of a desired orientation. Luminaire 10 is mounted to a support panel 20, such as a canopy or a panel retrofitable to a canopy.

Socket holder 12 generally includes a housing 22 with a first end 24 that supports socket 16 and light source 18 and a second end 26 that is adapted to mount socket holder 12 to optical assembly 14. Housing 22 is preferably conical in shape and hollow thereby defining an inner receiving area 28 for receiving socket 16 and the end of light source 18 engaged with socket 16. Housing 22 is also preferably formed of a substantially heat resistant material, such as metal, and is a unitary one-piece member.

First end 24 of housing 22, which is preferably the top end of housing 22, defines a central axis 30 and first and second surfaces 32 and 34 for supporting socket 16 and light source 18 in first and second orientations, respectively, as seen in FIGS. 2 and 3. An optional cap 35, see FIG. 4, can be used to cover first end 24 thereby protecting socket 18. First and second surfaces 32 and 34 are preferably proximate or close to one another. First and second surfaces 32 and 34 are preferably disposed on first and second walls 36 and 38, respectively. First wall 36 is substantially horizontal with respect to the sidewall 40 of housing 22. Second wall 38 extends away from first wall 36 and is angled with respect thereto. A shoulder wall 42 joins first and second walls 36 and 38. Disposed in both the first and second walls 36 and 38 are fastening holes 44 that receive fasteners 46 for securing socket 16 to either first wall 36 in the first orientation or second wall 38 in the second orientation.

As seen in FIG. 2, socket 16 is secured to first wall 36 by fasteners 46 so that light source 18 is in the first orientation. In the first orientation, first wall 36, socket 16 and light source 18 define a longitudinal axis 48 that is substantially parallel to central axis 30 of socket holder 12. The first orientation is preferably a substantially vertical orientation when luminaire 10 is mounted to support panel 20 that is substantially horizontal such that longitudinal axis 48 is substantially perpendicular to panel 20. However, if luminaire 10 is mounted to a vertical support panel or sidewall, or is mounted to a slanted support panel or wall, then the first orientation of socket 16 and light source 18 would be substantially perpendicular to the panel.

As seen in FIG. 3, second wall 38, socket 16 and light source 18 define a second longitudinal axis 50 in the second orientation. Second longitudinal axis 50 is angled with respect to central axis 30 of socket holder 12. An angle a is defined between longitudinal axis 50 and central axis 30. Angle a is preferably acute, such as 15 degrees, however, angle a can be substantially 0 degrees or substantially 90 degrees.

Although it is preferable that first wall 36 is substantially horizontal and second wall 38 is substantially angled therefrom, first wall 36 can also be angled thereby changing the first orientation of socket 16 and light source 18. For example, the first and second walls 36 and 38 can converge and meet to form an inverted V so that each longitudinal axis 48 and 50, respectively, is angled with respect to socket holder central axis 30. Similarly, the angle of second wall 38 can be varied between being generally aligned with first wall 36 so that longitudinal axes 48 and 50 are substantially parallel, and being generally perpendicular to first wall 36 so that second longitudinal axis 50 is substantially perpendicular to longitudinal axis 48.

The second end 26 of housing 22, which is preferably the bottom end, includes an outwardly extending circumferential flange 52 extending from a bottom edge of housing 22. Flange 52 includes generally planar upper and lower surfaces 54 and 56 and an outer shoulder 58. First and second mounting members 60 are supported by flange 52 and engage optical assembly 14. Although it is preferable to use two mounting members 60, any number of mounting members 60 can be employed and only one mounting member 60 is required.

Figure 4:
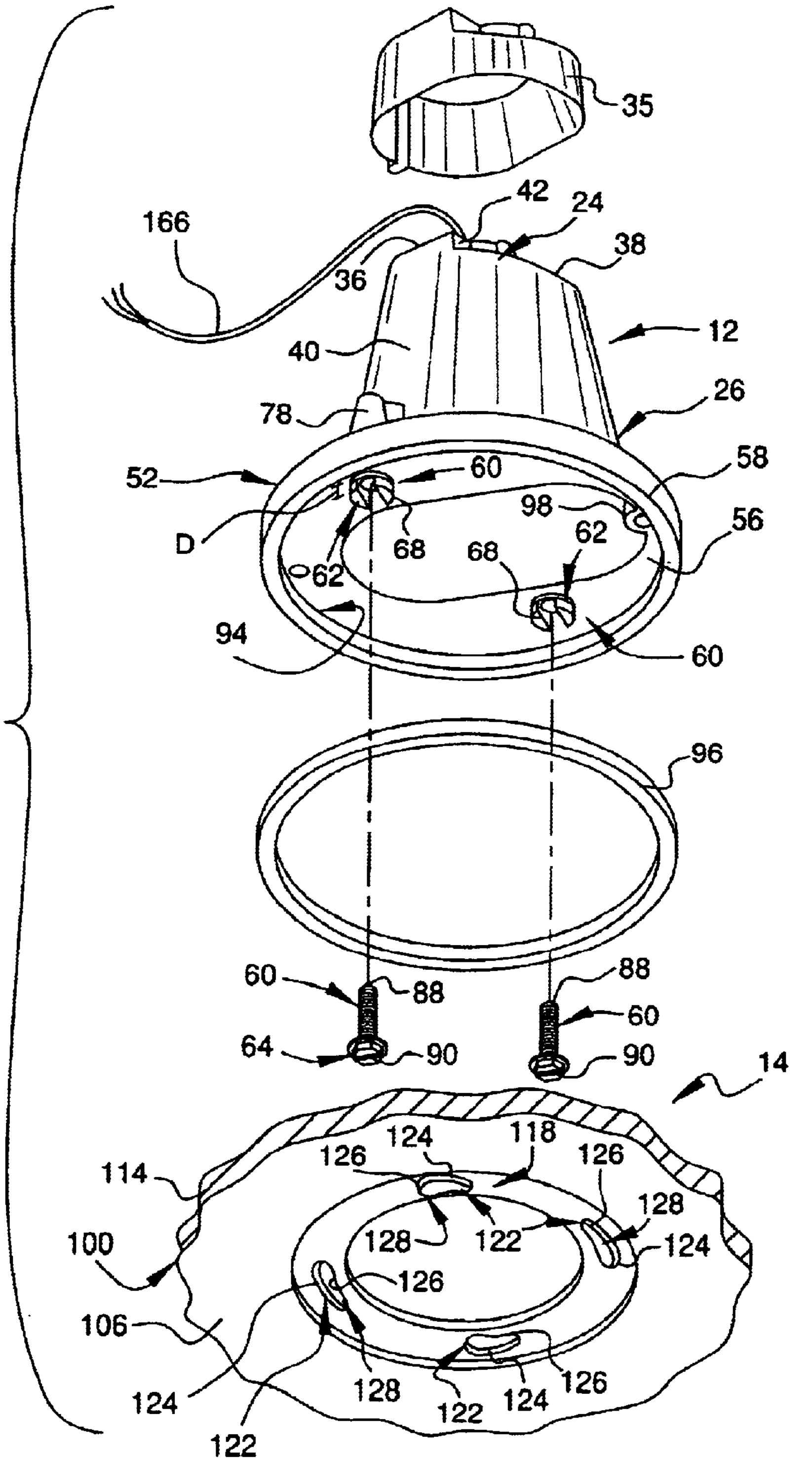
FIG. 4 is an exploded perspective view of the socket holder of the luminaire illustrated in FIG. 1 including a partial perspective view of the optical assembly of the luminaire.
Figure 5:
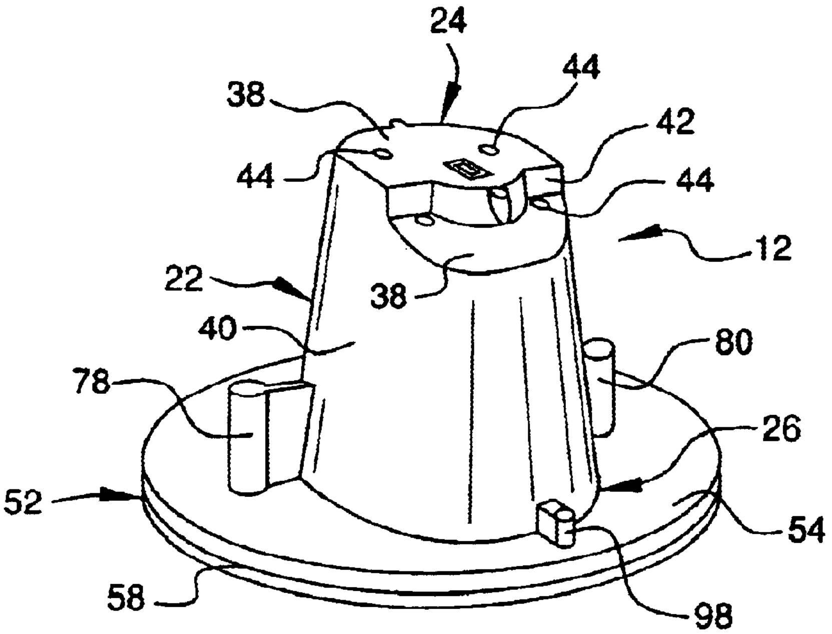
FIG. 5 is a perspective view of the socket holder of the luminaire illustrated in FIG. 1.

Each mounting member 60 includes a guide portion 62 for facilitating engagement of the mounting members 60 with optical assembly 14 and a locking portion 64 for interlocking the mounting members 60 with optical assembly 14, as seen in FIG. 4. Locking portion 64 is preferably a mounting bolt.

Figure 6:
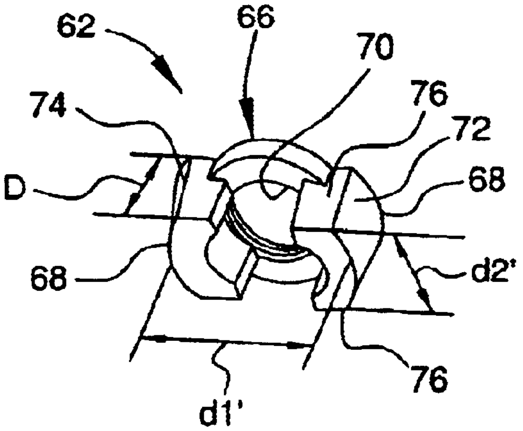
FIG. 6 is a perspective view of a guide portion of the luminaire illustrated in FIG. 1.

As seen in FIG. 6, guide portion 62 includes a ring body 66 with depending arcuate ears 68 extending from opposite radial sides of ring body 66. The central opening 70 of ring body 66 is threaded. A first dimension d1' of guide portion 62 is defined between the outer surfaces 72 and 74 of ears 68 respectively. A second dimension d2' of guide portion 62 is defined between the sides 76 of each ear 68. Each guide portion ring body 66 is attached to flange lower surface 56 so that ears 68 extend downwardly from flange lower surface 56 at substantially ninety degrees, as seen in FIG. 4. Although it is preferably to use ring body 66, body 66 can be eliminated such that ears 68 are directly attached to and extend from flange lower surface 56. Central opening 70 of each ring body 66 is aligned with first and second threaded receiving wells 78 and 80, respectively.

Figure 7:
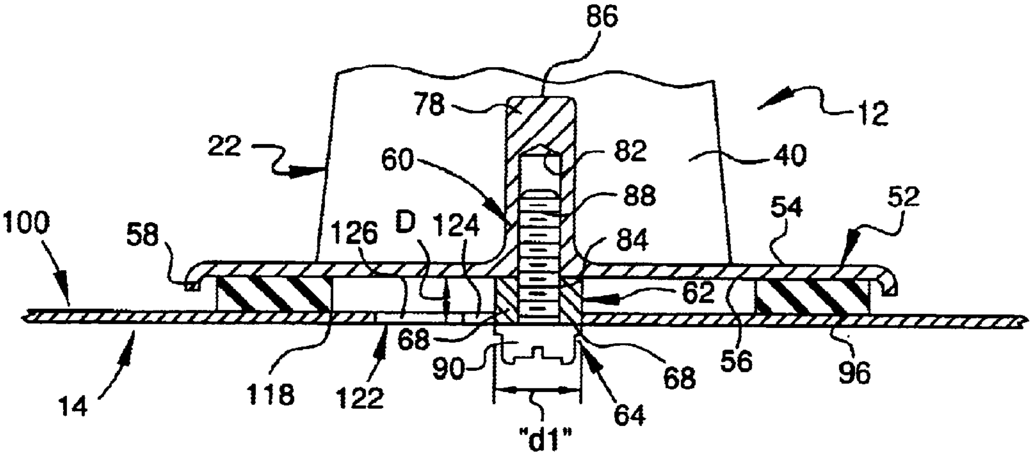
FIG. 7 is a partial elevational side view taken in section of the luminaire illustrated in FIG. 2, showing the socket holder and a mounting member thereof in an unlocked position with respect to the optical assembly.
Figure 8:
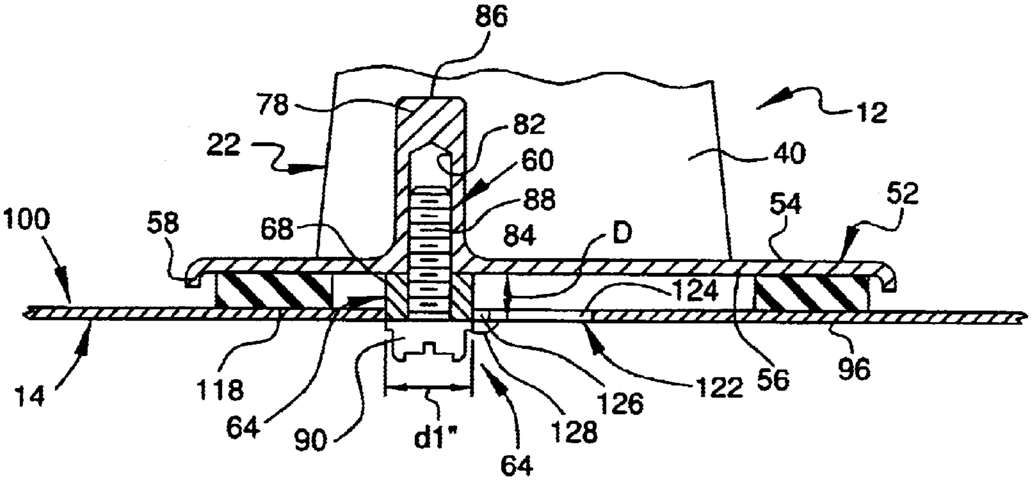
FIG. 8 is a partial elevational side view taken in section of the luminaire illustrated in FIG. 2, showing the socket holder and the mounting member thereof in a locked position with respect to the optical assembly.

As seen in FIGS. 7 and 8, first and second receiving wells 78 and 80 each extend upwardly from flange upper surface 54 and includes a hollow threaded interior 82, an open end 84 aligned with ring body 66 and an opposite closed end 86. Each guide portion 62 and corresponding receiving wells 78 or 80 are preferably disposed on opposite sides of socket holder housing 22. Threaded central opening 70 of ring body 66 of guide portion 62 and threaded interior 82 of each receiving well 78 and 80 are adapted to engage a part of locking portion 64, preferably a threaded stem 88 of the locking portion or mounting bolt 64.

Figure 9:
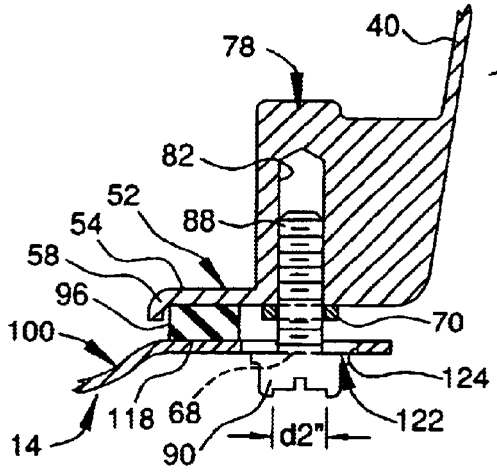
FIG. 9 is a partial elevational side view taken in section traverse to the sectional view of FIG. 7, showing the socket holder in the unlocked position.
Figure 10:
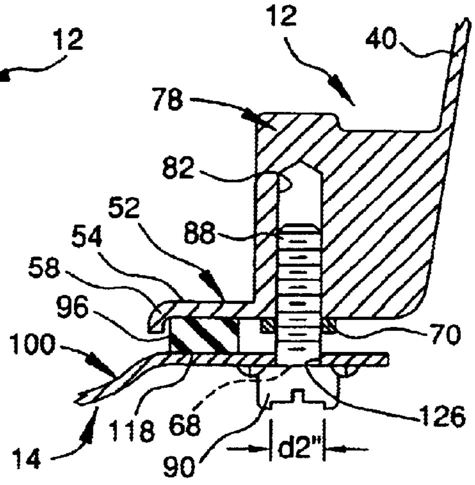
FIG. 10 is a partial elevational side view taken in section traverse to the sectional view of FIG. 8, showing the socket holder in the locked position.

Locking portion 64 of each mounting member 60 includes a bolt head 90 at a distal end of stem 88. Mounting bolt head 90 is adapted to engage a part of optical assembly 14, thereby interlocking socket holder 12 and optical assembly 14. The diameter of mounting bolt head 90 defines a first dimension d1" of locking portion 64, as best seen in FIGS. 7 and 8, that is substantially the same as the first dimension d1' of guide portion 62. A second dimension d2" of locking portion 64 is defined by the diameter of mounting bolt stem 88, as best seen in FIGS. 9 and 10, that is substantially the same as the second dimension d2' of guide portion 62. As such, when locking portion 64 is coupled with guide portion 62, the ears 68 of guide portion 62 will be as wide, i.e. the first dimension d1', as locking portion bolt head 90, i.e. the first dimension d1", as seen in FIGS. 6, 7 and 8. Ears 68 will also be as narrow, i.e. the second dimension d2', as locking portion stem 88, i.e. the second dimension d2", as seen in FIGS. 6, 9 and 10 (ears 68 being shown in dashed lines). This design facilitates engagement of locking portion 64 with optical assembly 14.

A gasket receiving recess 94 is formed between shoulder 58 and the lower surface 56 of flange 52. A ring shaped gasket 96 is received in recess 94. Gasket 96 abuts flange lower surface 56 and is disposed outside of mounting members 60 and adjacent outer shoulder 58 of flange 52. Gasket 96 is preferably made of compressible foam but can be any known compressible material such as rubber, felt and silicone. Secondary receiving wells 98 can be optionally included on socket housing 22 that are similar to but smaller than receiving wells 78 and 80. Secondary receiving wells 98 allow socket holder 12 to attached directly to support panel 20 as will be described below with respect to the second embodiment.

As seen in FIGS. 4 and 6–8, the distance D that guide portion ears 68 extend from the lower surface 56 of socket housing flange 52 controls the depth at which locking portion bolt stem 88 of each mounting member 60 extends or is threaded into receiving wells 78 and 80. This dictates the appropriate location of locking portion 64, particularly bolt head 90, for proper securement of locking portion 64 with optical assembly 14. This prevents locking portion 64 of each mounting members 60 from being threaded into receiving wells 78 and 80 too far which would create difficulty in engaging locking portion 64 with optical assembly 14, or not far enough which would create a loose or less secure engagement of locking portion 64 with optical assembly 14.

As seen in FIGS. 1–3, optical assembly 14 generally includes a reflector 100 coupled to a refractor 102 with light source 18 being enclosed therebetween. Reflector 100 is preferably bowl shaped with a circular outer perimeter 104 and inner and outer curved surfaces 106 and 108. Reflector 100 includes first and second end portions 110 and 112 with first end portion 110 being substantially smaller than second end portion 112. A reflector wall 114 extends between first and second end portions 110 and 112 and slopes or tapers outwardly from first end portion 11 to second end portion 112. Although it is preferable that reflector 100 is bowl shaped, reflector 100 can be other shapes such as a box or plate shaped as long as reflector 100 can engage support panel 20.

First end portion 110 of reflector 100 includes a central planar surface 116 having a mounting interface 118 for engaging mounting members 60 of socket holder 12 and a central opening 120 for receiving light source 18. Mounting interface 118 preferably includes mounting apertures 122 that engage locking portions 64 of mounting members 60. Mounting apertures 122 are preferably key hole shaped and disposed concentrically around central opening 120. Each key hole mounting aperture 122 includes first and second sections 124 and 126 with first section 124 being substantially larger than second section 126. A pair of locking detents 128 are also disposed of either side of each mounting aperture 122.

Second end portion 112 of reflector 100 includes an outer shoulder 130 extending from outer perimeter 104 and is formed by a first wall 132 that extends outwardly and a second wall 134 extending generally perpendicularly from first wall 132. Attached to the outer surface 108 of reflector 100 at shoulder first wall 132 is a conventional starter 146 and conventional capacitor 148 supported on a bracket 149, as seen in FIG. 1. Although it is preferable that reflector 100 supports starter 146 and capacitor 148, starter 146 and capacitor 148 can be located remotely therefrom such as on support panel 20.

Refractor 102 is preferably a glass lens but can be formed of a plastic material as well. Refractor 102 has bowl shape with smooth inner and outer surfaces 138 and 140 and an outer edge 142. A ring shaped gasket 144 is disposed between reflector 100 and refractor 102 and is preferably disposed on outer edge 142 of refractor 102. Gasket 144 is preferably made of a rubber material but can be made of any known material such as felt.

Support panel 20 is preferably a panel that can be retrofit into an existing canopy or ceiling 150 (see FIGS. 2 and 3) in the same manner disclosed in commonly owned U.S. Pat. No. 6,276,818 to Wang and entitled Latch Assembly For Luminaire Housing Door, and U.S. Pat. No. 6,182,848 to Wang and entitled Luminaire Housing With Universal Dual Surface cantilever Hinge, the subject matter of each of which is herein incorporated by reference. In such a retrofit application, support panel 20 includes at least one hinge 152 and at least one latch 154 for mounting the panel 20 to an existing canopy or ceiling in the same manner described in U.S. Pat. No. 6,394,628. However, support 20 can also be just the canopy or ceiling in new installation applications.

Support panel 20, whether in a retrofit or new installation application, includes an opening 156 for supporting optical assembly 14. Securing fasteners 158 are used to secure reflector 100 and refractor 102 with respect to panel 20 thereby securing optical assembly 14 and restricting the movement thereof with respect to panel 20. Support panel also includes generally planar upper and lower surfaces 160 and 162. Opening 156 is defined by a perimeter edge of 164.

Assembly of Embodiment of FIGS. 1–10

Assembly of luminaire 10 initially requires mounting socket holder 12 to optical assembly 14 at the mounting interface 118 of reflector 100. Specifically, locking portions 64 of each mounting member 60 are coupled to corresponding guide portions 62 and receiving wells 78 and 80, respectively, of socket housing 22. Since mounting members 60 are substantially identical, the assembly of only one mounting member 60 is described. Mounting bolt stem 88 of mounting member 60 is threaded through central opening 70 of a respective guide portion ring body 66 and into a threaded receiving well 78 and 80, respectively, (see FIG. 7, showing receiving well 78) until mounting bolt head 90 abut ears 68 of the guide portion 62. This places mounting bolt head 90 at the appropriate distance from socket housing flange 52 for proper engagement with reflector 100 of optical assembly 14.

Socket holder 12 can then be mounted to mounting interface 118 of reflector 100 by inserting mounting bolt heads 90 of each mounting member 60 into first sections 124 of respective mounting aperture key holes 122 of the mounting interface 118, as seen in FIG. 7. Since mounting members 60 of socket holder 12 are substantially identical and key holes 122 are substantially identical, the engagement of only one mounting member and one key hole 122 is described. In this initial position, socket holder 12 is unlocked with respect to reflector 100, the bottom of ears 68 of mounting member guide portion 62 abut a distal edge 136 of key hole first section 124. Also, mounting bolt head 90 is located just below reflector wall 114 with mounting bolt stem 88 extending through key hole first section 124. The first dimension d1' of guide portion ears 68 and the first dimension d1" of mounting bolt head 90 are slightly less than the width of key hole first section 124 allowing easy insertion of mounting bolt head 90 and ears 68 into key hole first section 124, as seen in FIG. 9. Gasket 96 is received in receiving recess 94 of socket holder 12 and rests on outer surface 108 of reflector wall 114 surrounding mounting aperture key holes 122. Gasket 96 is sandwiched between socket housing flange 52 and reflector 100.

Socket holder 12 can then be rotated about its central axis 30, preferably clockwise, to a locked position with reflector 100 remaining stationary. Specifically, while rotating socket holder 12, gasket 96 is compressed, thereby lowering mounting bolt head 90 with respect to reflector wall 114 to clear locking detents 128 located on reflector wall inner surface 106 as guide portion 62 and mounting bolt stem 88 pass from key hole first section 124 to key hole second section 126. Once locking detents 128 are cleared, socket holder 12 is released allowing gasket 96 to expand to its near normal thickness, thereby lifting mounting bolt head 90 until it abuts reflector wall inner surface 106 to provide a tight engagement between mounting bolt head 90 and reflector wall 114. Gasket 96 also provides a seal against water and insects. In this locked position, ears 68 of mounting member 60 abut a distal edge 137, opposite distal edge 136, of second section 126 of mounting aperture key hole 122. Since the second dimension d2' of ears 68 is less than the mounting bolt head first dimension d1" and is generally equal to mounting bolt stem dimension d2", ears 68 fit into key hole second section 126, as seen in FIG. 10. Mounting bolt head 90 is trapped underneath reflector wall 114 with locking detents 128 preventing lateral movement of mounting member 60, as seen in FIGS. 8 and 10.

To move socket holder 12 back to the unlocked position, gasket 96 is again compressed while socket holder 12 is rotated about central axis in a direction opposite that direction to lock socket holder 12, preferably a counter clockwise direction. By compressing gasket 96, mounting bolt head 90 is lowered and clears locking detents 128 as ears 68 and mounting bolt stem 88 pass from key hole second section 126 back to key hole first section 124. Socket holder 12 can then be disengaged from reflector 100 by lifting mounting member 60, specifically mounting bolt head 90 and ears 68 from key hole first section 124. Since ears 68 have the same width or first dimension d1 as mounting bolt head first dimension d1", disengagement and removal of mounting bolt head 90 from key hole 122 is facilitated. In particular, ears 68 will abut distal edge of key hole first section 124 thereby so that mounting bolt head 90 can be pulled straight through key hole first section 124 without interference from reflector wall 114. Without ears 68, a portion of mounting bolt head 90 would likely slide underneath reflector wall 114 so that when attempting to pull mounting bolt head 90 through key hole first section 124, that portion of mounting bolt head 90 would abut inner surface 106 of reflector wall 114, thereby preventing easy removal of mounting bolt head 90.

The mounting member 60 and key hole 122 arrangement is preferably used to releasably secure socket holder 12 to reflector 100 of optical assembly 14 since this allows easy installation of socket holder 212 and light source 18 and facilitates replacement of light source 18 by simply rotating and unlocking socket holder 12. However, other known mounting mechanisms can be used such as using brackets or clips. Also, a fixed attachment can be used to secure socket holder 12 and reflector 100 such as by welding or using a sealant or adhesive. Additionally, although it is preferable that each mounting member 60 be formed of a separate guide portion 62 and locking portion 64 coupled together, each mounting member 60 can be formed as a one-piece member incorporating guide portion 62 and locking portion 64.

Socket 16 and light source 18 can then be mounted to socket holder 12 in a desired position, i.e. in the first or second orientation. In the first orientation, socket 16 is secured to first surface 32 on first wall 36 by fasteners 46 so that socket 16 abuts first wall 36 and the longitudinal axis 48 of light source 18 is generally parallel to central axis 30 of socket holder 12, as seen in FIG. 2. Similarly, in the second orientation, socket 16 is secured to second surface 34 on second wall 38 by fasteners 48 so that the longitudinal axis 50 of light source 18 is angled with respect to socket holder central axis 30, as seen in FIG. 3. In either orientation, light source 18 extends through central opening 120 of first end portion 110 of reflector 100.

Optical assembly 14 is mounted to support panel 20 by securing reflector 100 to the upper surface 160 of panel 20 with outer edge 142 of refractor 102 being disposed between reflector 100 and panel 20, as best seen in FIGS. 2 and 3. Socket holder 12 can be mounted to reflector 100 as described above either before or after optical assembly 14 is mounted to support panel 20. Refractor 102 is placed in panel opening 156 allowing refractor 102 to drop below panel 20 due to its bowl shape with the outer edge 142 remaining above panel 20. The outer surface 140 of refractor 102 rests on the perimeter edge 164 of panel opening 156. Reflector 100 is placed over panel opening 156 above panel 20, thereby covering refractor 102, with second wall 134 of outer shoulder 130 resting on panel upper surface 160. Light source 18 extends through panel opening 156 and below panel 20. Refractor 102 encloses light source 18 from below and allows light to emanate therefrom. Second wall 134 of reflector outer shoulder 130 is spaced from refractor outer edge 142. Gasket 144 is disposed between reflector shoulder first wall 132 and refractor outer edge 142 to provide a seal therebetween.

Securing fasteners 158 are used to secure optical assembly 14 with respect to panel 20. In particular, each fastener 158 is inserted through panel 20 and through reflector shoulder first wall 132, as seen in FIGS. 2 and 3. This secures reflector 100 to panel 20 and in turn secures refractor 102 which is sandwiched between reflector 100 and panel 20. Thus, once optical assembly 14 is mounted to panel 20, optical assembly 14 is substantially restricted from moving with respect to panel 20. Also, reflector 100 acts as a support for socket holder 12 including socket 16 and light source 18. This eliminates the need for an additional part to support socket 16 and light source 18. A conventional ballast (not shown) is preferably remotely located such as on the panel upper surface 160. However, the ballast does not have to be remotely located. For example, the ballast can be placed closed to socket holder 12 by any type of known support member. Wires 166 (see FIG. 4) electrically connect socket 16 and the ballast.

In retrofit applications, panel 20 with luminaire 10 mounted thereon as described above, is itself mounted to a canopy or ceiling 160 in the same manner as described in U.S. Pat. Nos. 6,276,818 and 6,182,848 and therefore is not described in detail. In general, panel 20 with luminaire 10 mounted thereto is inserted into a canopy or ceiling opening 168 (see FIGS. 2 and 3), typically after an existing luminaire has been removed. Hinges 152 engage the canopy and allow panel 20 to pivot with respect to the canopy. Latches 154 secure panel 20 and luminaire 10 in the canopy when the panel 20 is pivoted up into the canopy or ceiling opening 168. Either the ballast from the pre-existing luminaire or a new ballast can be connected to socket 16 of luminaire 10 by wires 166. In new installation applications, luminaire 10 is simply mounted to support panel 20 as described above.

Embodiment of FIGS. 11–14

Figure 11:
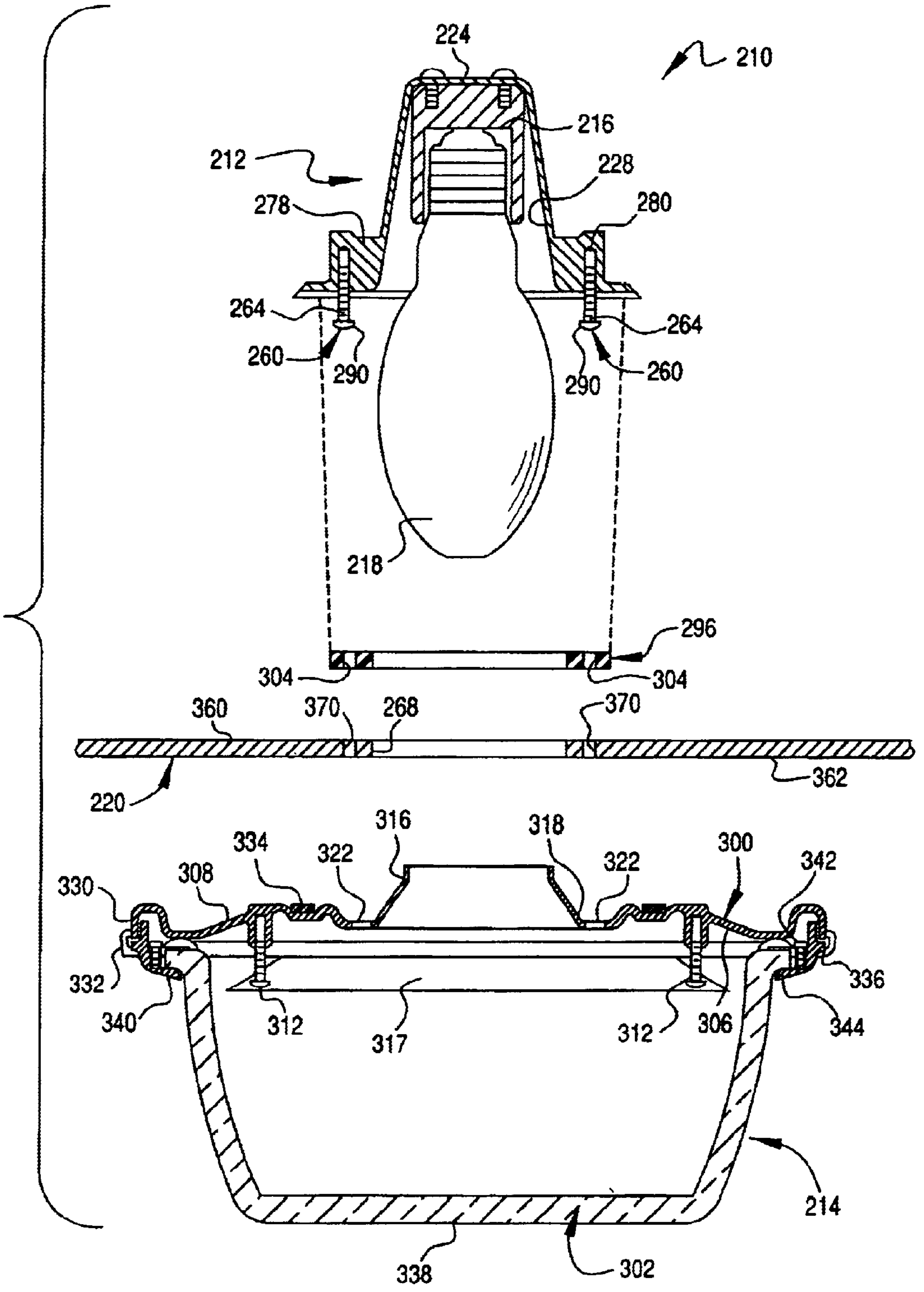
FIG. 11 is an exploded elevational side view of a luminaire in accordance with a second embodiment of the present invention, showing a socket holder, optical assembly and support panel.
Figure 12:
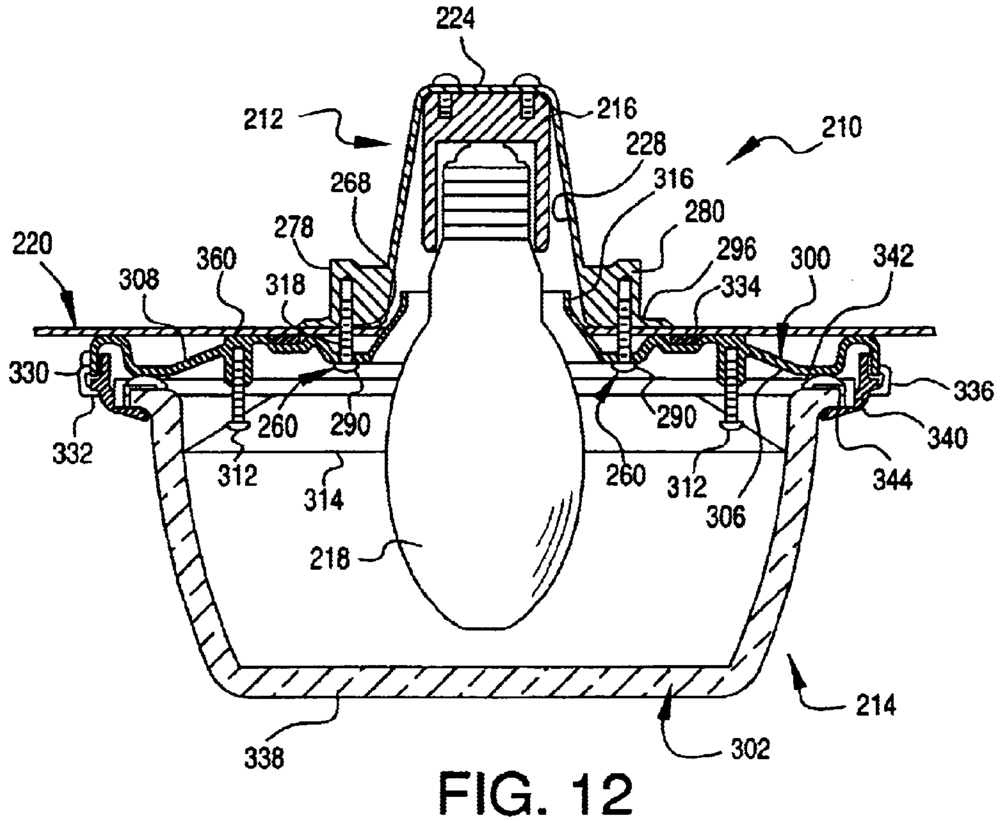
FIG. 12 is an elevational side view taken in section of the assembled luminaire illustrated in FIG. 11, showing a light source of the luminaire in a first orientation.
Figure 13:
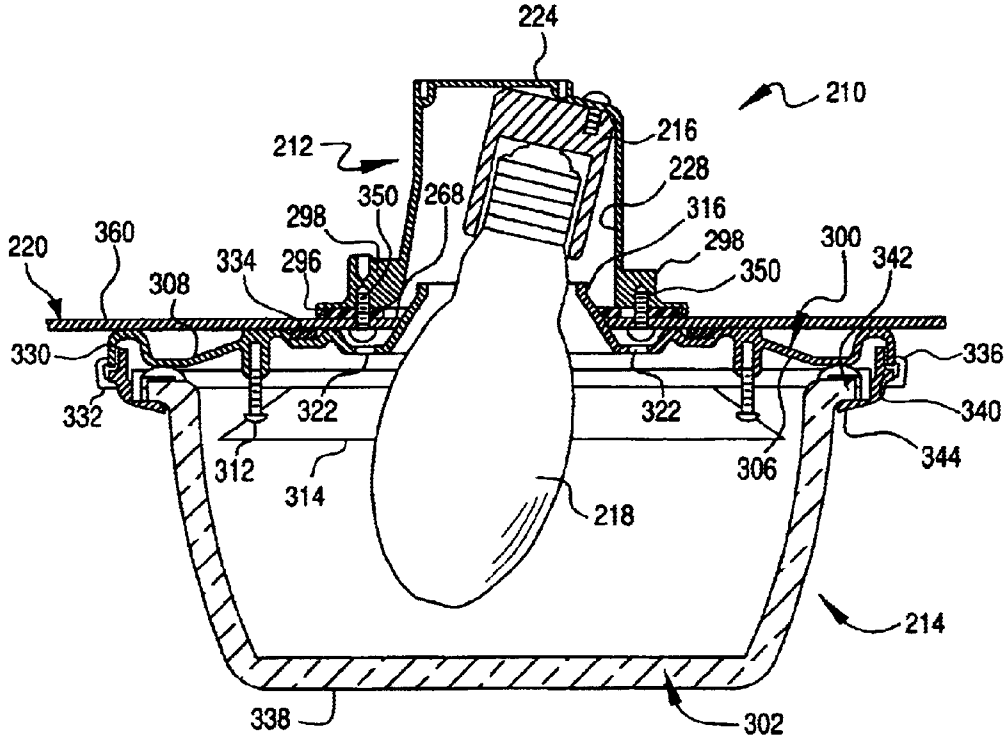
FIG. 13 is an elevational side view taken in section traverse to the sectional view of the assembled luminaire illustrated in FIG. 12, showing the light source of the luminaire in a second orientation.

Referring to FIGS. 11–14, a luminaire 210 in accordance with a second embodiment of the invention generally includes a socket holder 212 secured to a support panel 220 and an optical assembly 214 releasably coupled to socket holder 212. Support panel 220 can be either a retrofit panel for attachment to a canopy or ceiling or can be the canopy or ceiling itself. Socket holder 212 supports a socket 216 and a light source 218. Socket holder 212 can support light source 218 in more than one orientation, as seen in FIGS. 12 and 13, allowing selection of a desired orientation. Optical assembly 214 encloses light source 218 and allows light rays to emanate therefrom.

Socket holder 212 is substantially identical to socket holder 12 of the first embodiment and therefore the reference numerals used to describe socket holder 212 are the same as the reference numerals for socket holder 12 with the numeral 2 added to the front. Gasket 296 differs from gasket 96 of the first embodiment in that it is wider and includes openings 304, see FIG. 11, that allow mounting members or bolts 260 to extend through gasket 296. Socket holder 212 includes mounting members 260 that are mounting bolts 264 each with a bolt head 290. Two mounting members 260 do not include a guide portion like guide portion 62 of the first embodiment. Each mounting bolt 264 is threaded into a portion of respective receiving wells 278 and 280 leaving a substantially part of each mounting bolt 264 exposed under socket holder 212 for easy engagement with optical assembly 214.

Figure 14:
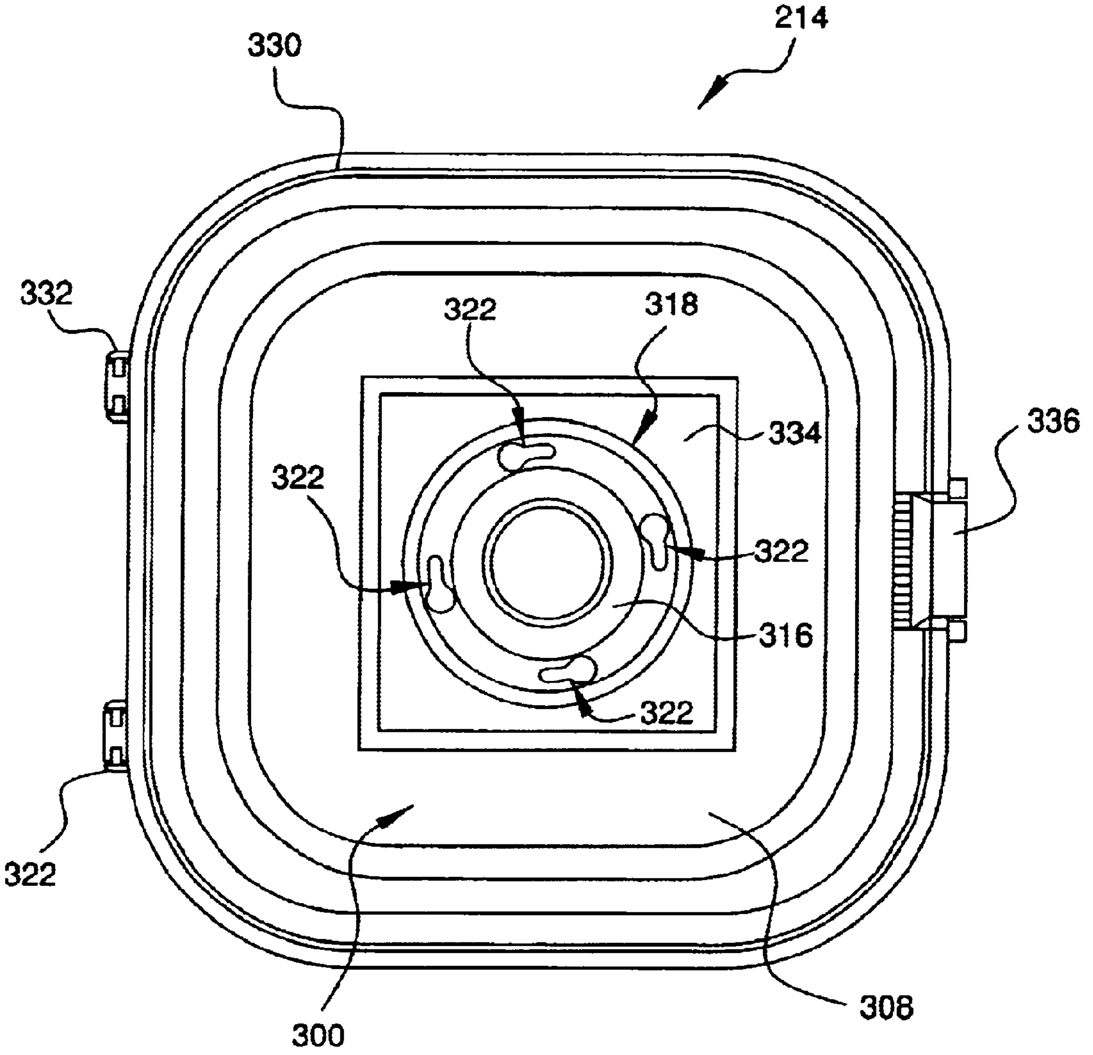
FIG. 14 is a top plan view of the optical assembly of the luminaire illustrated in FIG. 11.

Optical assembly 214 is substantially similar to the optical assembly disclosed in U.S. Pat. No. 6,394,628 to Wang and entitled Ballast Housing For Luminaire, the subject matter of which is herein incorporated by reference, and is therefore described only in sufficient to understand the present invention. In general, optical assembly 214 includes a mounting casting 300 coupled to a refractor 302. Inner surface 306 of mounting member 306 includes a reflective coating so that mounting member 300 acts a reflector. Mounting casting 300 includes a central mounting interface 318 including a mounting cone 316 and mounting apertures or key holes 322, as best seen in FIG. 14. Key holes 322 are substantially identical to key holes 122 of the first embodiment.

A second gasket 334 is generaly square shaped with a central hole and rests on the upper surface 308 of mounting casting 300 surrounding key holes 322, as seen in FIG. 14. Mounting casting 300 includes an outer perimeter shoulder 330 adapted to engage refractor 302 by hinges 332 and latch 336 (see FIG. 14.), as described in U.S. Pat. No. 6,394,628. Extending from the inner or lower surface 306 of mounting casting 300 are optional fasteners 312 for supporting a reflector 314.

Refractor 302 is preferably a bowl shaped glass lens with a flat bottom 338 and includes a frame 340 that is attached to and disposed around an upper outer edge 342 of refractor 302. As with refractor 102 of the first embodiment, refractor 302 can be a variety of shapes as desired. Frame 340 is adapted for engaging reflector outer shoulder 330 via hinges 332 and latch 336. A third ring gasket 344 is disposed around refractor outer edge 342 between frame 340 and refractor 302 thereby creating a seal between refractor 102 and frame 340.

Support panel 220 includes upper and lower surfaces 360 and 362 and an opening 368 for mounting luminaire 210. Disposed concentrically around panel opening 368 are preferably four mounting holes 370 (see FIG. 11 showing two mounting holes 370).

Assembly of Embodiment of FIGS. 11–14

Assembly of luminaire 210 initially requires assembly of mounting members 260 with receiving wells 278 and 280 of socket holder 212 by threading each mounting bolt 264 into a respective receiving well 278 and 280 and leaving a substantial part of each bolt 254 exposed, as best seen in FIG. 11. Additionally, mounting bolts 264 of each mounting member 260 are also inserted through openings 304 of gasket 296 with gasket 296 being located between socket holder flange 252 and the mounting bolt heads 290 of bolts 264. Socket 216 and light source 218 are secured to socket holder 212 first end 224 in either the first or second orientation as described above with respect to the first embodiment.

Socket holder 212 is then secured to the upper surface 360 of panel 220 by fasteners 350, as seen in FIG. 13. In particular, socket holder 212 is placed over panel opening 368 so that gasket 296 of socket holder 212 is disposed on panel upper surface 360 around panel opening 368 and socket holder flange 252 also extends around panel 368. Preferably two fasteners 350 are inserted through two of the panel mounting holes 370, respectively, and threaded into secondary receiving wells 298 of socket holder 212 thereby securing socket holder 212 to panel 220, as seen in FIG. 13. At the same time, mounting bolts 264 of mounting members 260 are inserted through the remaining two panel openings 270, as seen in FIG. 12, as extend below panel 220. Light source 218, whether in the first or second orientation extends through panel opening 268. A conventional ballast, starter and capacitor (not shown) are preferably located on panel upper surface 360 and electrically connected to socket 216 by wiring.

With socket holder 212 secured in place on panel 220, optical assembly 214 is mounted to socket holder 212 by engaging mounting members 260 with mounting interface 318 of mounting casting 300. Specifically, optical assembly 214 is lifted so that mounting bolt heads 290 of mounting members 260 extend through key holes 322 of mounting casting 300. Also, mounting cone 316 of mounting casting 300 extends into inner receiving are 228 of socket holder 212 to facilitate proper positioning of optical assembly 214 with respect to socket holder 212. Optical assembly 214 is rotated, such as clockwise, to lock mounting bolt heads 290 with respect to key holes 322, in the same manner as described above except no guide portions are used with mounting members 260. Also the engagement of mounting members 260 and key holes 322 is the same as described regarding similar mounting mechanisms in U.S. Pat. No. 6,394,628. To remove optical assembly 214, the assembly 214 is rotated in the opposite direction, such as clockwise.

Although using a mounting bolt 264 and key hole 322 engagement is preferable to secure optical assembly to socket holder 212. This allows for a variety of optical assemblies to be mounted to socket holder 212 as long as they include key holes for engagement with mounting members 260 of socket holder 212. However, any known securing or mounting mechanism can be used. For example, fasteners that extend through mounting casting 300, panel 220 and socket holder flange 252 can be used to fixed optical assembly 214 with respect to panel 220 and socket holder 212. Alternatively, brackets or clips can be used to connect optical assembly to either socket holder 212 or panel 220 or both.

Although it is preferably two employ two mounting members 260 and two fasteners 350 with socket holder 212, any number of mounting members 260 or fasteners 350 can be used and only one mounting member 260 and one fastener 350 is required. Similarly, any number of key holes 322 can be used and only one key hole 322 is required.

If panel 220 is a retro-fit panel to be used in retrofitting or replacing an existing luminaire, panel 220 and luminaire 210 mounted thereon would be mounted to an existing canopy or ceiling in the same manner as described above with respect to the first embodiment.

While particular embodiments have been chosen to illustrate the invention, it will be understood by those skilled in the art that various changes and modifications can be made therein without departing from the scope of the invention as defined in the appended claims.

What is claimed is:

1. A luminaire, comprising:

an optical assembly having a mounting interface; and a socket holder having a mounting member adapted to mount said socket holder to said mounting interface of said optical assembly, and first and second proximate surfaces adapted to support a socket and a light source in first and second orientations, respectively, and said socket holder defining a central axis, wherein a longitudinal axis defined by said socket and said light source in said first orientation is substantially parallel to said central axis of said socket holder and a longitudinal axis of said socket and said light source in said second orientation is angled with respect to said central axis of said socket holder.

2. A luminaire according to claim 1, wherein said first surface is disposed on a substantially horizontal wall and said second surface is disposed on an angled wall extending from said horizontal wall.

3. A luminaire according to claim 2, wherein a substantially vertical transition shoulder wall is disposed between said horizontal wall and said angled wall.

4. A luminaire according to claim 1, wherein said longitudinal axis of said socket and said light source at said second orientation forms an acute angle with said longitudinal axis of said socket and said light source in said first orientation.

5. A luminaire according to claim 1, wherein said socket and said light source are substantially vertical in said first orientation.

6. A luminaire according to claim 1, wherein said socket holder includes a substantially conical housing with first and second opposite ends, a horizontal wall and an angled wall extending from said horizontal wall at said first end, and an opening at a second end allowing said light source to extend therethrough in both said first and second orientations.

7. A luminaire according to claim 6, wherein said first surface is disposed on said horizontal wall; and said second surface is disposed on said angled wall.

8. A luminaire according to claim 1, wherein said mounting member is remote from said first and second surfaces.

9. A luminaire according to claim 1, wherein said mounting interface is located on a reflector of said optical assembly.

10. A luminaire according to claim 9, wherein said optical assembly includes a refractor; and said reflector and said refractor substantially enclose said light source.

11. A luminaire according to claim 1, wherein said socket holder is movable between an unlocked position with said mounting member being disengaged from said mounting interface and a locked position with said mounting member being engaged with said mounting interface, thereby interlocking said socket holder and said optical assembly.

12. A luminaire according to claim 1, wherein a first fastener releasably attaches said socket to said first surface in said first orientation, and releasably attaches said socket to said second surface in said second orientation.

13. A luminaire according to claim 1, wherein said socket holder is a unitary member.

14. A luminaire according to claim 1, wherein said mounting member is a bolt; and said mounting interface is a key hole shaped aperture.

15. A luminaire, comprising:

an optical assembly having a mounting interface, said mounting interface including at least one mounting aperture; and a socket holder coupled to said optical assembly and supporting a socket and a light source at a first end, said socket holder being movable between locked and unlocked positions with respect to said mounting interface of said optical assembly and including a mounting member at a second end opposite said first end that is adapted to mount said socket holder to said mounting interface of said optical assembly, said mounting member having a guide portion and a locking portion engaged with said mounting aperture of said mounting interface of said optical assembly in said locked position thereby interlocking said socket holder and said optical assembly, and disengaged with said mounting aperture in said unlocked position, wherein said guide portion facilitates engagement and disengagement of said locking portion with said mounting aperture.

16. A luminaire according to claim 15, wherein said guide portion has a first dimension that is substantially equivalent to a dimension of said locking portion; and said guide portion has a second dimension substantially transverse to said first dimension that is substantially less than said dimension of said locking portion.

17. A luminaire according to claim 16, wherein each of said guide portion and said locking portion are received in said mounting aperture.

18. A luminaire according to claim 15, wherein said mounting aperture is a key hole with first and second sections, said first section is substantially larger than said second section.

19. A luminaire according to claim 18, wherein said locking portion has a dimension adapted to allow said locking portion to be received in said first section of said key hole, and adapted to prevent said locking portion from being received in said second section;

said guide portion has a first dimension substantially equivalent to said dimension of said locking portion, thereby facilitating insertion and removal of said locking portion with respect to said first section; and said guide portion has a second dimension adapted to allow said guide portion to be received in said second section of said key hole.

20. A luminaire according to claim 15, wherein a compressible gasket is disposed between said socket holder and said mounting interface.

21. A luminaire according to claim 15, wherein said guide portion is separate from said locking portion.

22. A luminaire according to claim 15, wherein said socket holder includes a conical housing with a wall at said first end supporting said socket and said light source and a flange at said second end supporting said guide portion of said mounting member.

23. A luminaire according to claim 15, wherein said socket holder includes first and second proximate surfaces adapted to support said socket and said light source in first and second orientations, and said first and second orientations being acutely angled from one another.

24. A luminaire according to claim 15, wherein said socket holder includes a fastening member spaced from said mounting member for securing said socket holder to a panel.

25. A luminaire according to claim 15, wherein said guide portion includes a ring with a central opening and first and second depending walls; and said locking portion is a bolt received in said ring of said guide portion with a head of said bolt abutting said depending walls of said guide portion.

26. A luminaire, comprising:

a support panel;

an optical assembly including a reflector coupled to a refractor, said reflector being releasably secured to said support panel thereby substantially restricting movement of said optical assembly with respect to said support panel, and said reflector including a mounting interface; and a socket holder coupled to said reflector of said optical assembly at said mounting interface, said socket holder being movable between locked and unlocked positions with respect to said reflector and said optical assembly and supporting a socket and a light source with said reflector and said refractor substantially enclosing said light source.

27. A luminaire according to claim 26, wherein said socket holder rotates with respect a central axis between said locked and unlocked positions.

28. A luminaire according to claim 26, wherein said reflector is located above said support panel.

29. A luminaire according to claim 28, wherein said reflector is releasably secured to an upper surface of said support panel.

30. A luminaire according to claim 29, wherein said reflector includes a shoulder extending from an outer perimeter opposite said mounting interface for engaging said support panel.

31. A luminaire according to claim 26, wherein said socket holder includes first and second proximate surfaces that support said socket and said light source in first and second orientations, respectively.

32. A luminaire according to claim 31, wherein said second surface is angled with respect to said first surface and said second orientation is angled with respect to said first orientation.

33. A luminaire according to claim 26, wherein said light source extends through an opening in each of said reflector and said support panel so that a portion of said light source is below said support panel.

34. A luminaire according to claim 26, wherein said socket holder includes a mounting bolt that engages a mounting aperture of said mounting interface of said reflector when said socket holder is in said locked position.

35. A luminaire according to claim 34, wherein said mounting bolt includes a guide portion for facilitating insertion and removal of said mounting bolt from said mounting aperture.

36. A luminaire according to claim 26, wherein said refractor is substantially curved and encloses said light source from below said light source and said support panel.

* * * * *